US012222707B2

(12) United States Patent
Liu et al.

(10) Patent No.: US 12,222,707 B2
(45) Date of Patent: Feb. 11, 2025

(54) PRODUCTION SCHEDULE ESTIMATION METHOD AND SYSTEM OF SEMICONDUCTOR PROCESS

(71) Applicant: Powerchip Semiconductor Manufacturing Corporation, Hsinchu (TW)

(72) Inventors: Chih-Neng Liu, Hsinchu (TW); Chih-Chuen Huang, Hsinchu (TW); Chia-Jen Fu, Hsinchu (TW); Chih-Hsiang Chang, Hsinchu (TW)

(73) Assignee: Powerchip Semiconductor Manufacturing Corporation, Hsinchu (TW)

( * ) Notice: Subject to any disclaimer, the term of this patent is extended or adjusted under 35 U.S.C. 154(b) by 537 days.

(21) Appl. No.: 17/491,502

(22) Filed: Sep. 30, 2021

(65) Prior Publication Data

US 2023/0066892 A1 Mar. 2, 2023

(30) Foreign Application Priority Data

Aug. 26, 2021 (TW) .................. 110131566

(51) Int. Cl.
*G05B 19/418* (2006.01)
*G06N 20/00* (2019.01)

(52) U.S. Cl.
CPC ....... *G05B 19/41865* (2013.01); *G06N 20/00* (2019.01); *G05B 2219/32252* (2013.01)

(58) Field of Classification Search
CPC .... G05B 19/41865; G05B 2219/32252; G05B 2219/45031; G06N 20/00
See application file for complete search history.

(56) References Cited

U.S. PATENT DOCUMENTS 5,825,650 A * 10/1998 Wang ............... G05B 19/41865
700/121
7,653,451 B2 * 1/2010 Denton ............ G05B 19/41865
700/99

(Continued)

FOREIGN PATENT DOCUMENTS

TW 201532118 8/2015

OTHER PUBLICATIONS

"Office Action of Taiwan Counterpart Application", issued on Feb. 23, 2023, p. 1-p. 9.

*Primary Examiner* — M. N. Von Buhr
(74) *Attorney, Agent, or Firm* — JCIPRNET

(57) ABSTRACT

A production schedule estimation method and a production schedule estimation system are provided. The production schedule estimation method includes the following steps. Current-day work-in-process data, machine group cycle time data of a machine group, and productivity data of the machine group are obtained. The current-day work-in-process data, the cycle time data of the machine group, and the productivity data of the machine group are inputted into a prediction model. Current-day cycle time data and a current-day move volume for each of multiple stations in the machine group are calculated through the prediction model. And, current-day move data is calculated according to the current-day cycle time data and the current-day move volume for each of the multiple stations in the machine group.

12 Claims, 3 Drawing Sheets

(56) References Cited

U.S. PATENT DOCUMENTS

| | | | |
|---|---|---|---|
| 7,844,433 B2* | 11/2010 | Masuda | G05B 19/41865 |
| | | | 703/13 |
| 7,908,127 B2 | 3/2011 | Weigang et al. | |
| 8,185,226 B2* | 5/2012 | Weigang | G05B 19/41865 |
| | | | 700/99 |
| 8,612,043 B2* | 12/2013 | Moyne | G06Q 10/06 |
| | | | 700/121 |
| 8,774,956 B2* | 7/2014 | Moyne | G05B 19/41865 |
| | | | 700/109 |
| 9,275,335 B2* | 3/2016 | Kaushal | G05B 13/0265 |
| 11,556,119 B2* | 1/2023 | Shi | G05B 19/41865 |
| 2015/0162180 A1* | 6/2015 | Grau | H01L 21/02 |
| | | | 700/121 |

* cited by examiner

PRODUCTION SCHEDULE ESTIMATION METHOD AND SYSTEM OF SEMICONDUCTOR PROCESS

CROSS-REFERENCE TO RELATED APPLICATION

This application claims the priority benefit of Taiwan application serial no. 110131566, filed on Aug. 26, 2021. The entirety of the above-mentioned patent application is hereby incorporated by reference herein and made a part of this specification.

BACKGROUND

Technical Field

This disclosure relates to an estimation method and an estimation system, and in particular to a production schedule estimation method and a production schedule estimation system of a semiconductor process.

Description of Related Art

For a traditional production schedule inference of a semiconductor process, the production time may only be calculated by using a fixed cycle time of a machine calculated from the process historical data of each machine group. In this regard, as the traditional production scheduling inference of the semiconductor process cannot respond to a change in the cycle time of the machine due to different product combinations, quantities, and other different conditions, therefore, the traditional production scheduling inference method of the semiconductor process has poor accuracy.

SUMMARY

The disclosure provides a production schedule estimation method and a production schedule estimation system of a semiconductor process, which can perform an accurate schedule estimation of the semiconductor process.

The production schedule estimation method of the semiconductor process according to the disclosure includes the following steps. Current-day work-in-process data, machine group cycle time data of a machine group, and productivity data of the machine group are obtained. The current-day work-in-process data, the cycle time data of the machine group, and the productivity data of the machine group are inputted into a prediction model. Current-day cycle time data and a current-day move volume for each of multiple stations in the machine group are calculated through the prediction model. And, current-day move data is calculated according to the current-day cycle time data and the current-day move volume for each of the multiple stations in the machine group.

The production schedule estimation system of the semiconductor process of the disclosure includes a storage device and a processing device. The storage device is configured to store a prediction model. The processing device is coupled to the storage device and is configured to execute the prediction model. The processing device obtains current-day work-in-process data, cycle time data of a machine group, and productivity data of the machine group, and inputs the current-day work-in-process data, the cycle time data of the machine group, and the productivity data of the machine group into the prediction model, so as to calculate current-day cycle time data and a current-day move volume for each of multiple stations in the machine group through the prediction model. The processing device calculates current-day move data according to the current-day cycle time data and the current-day move volume for each of the multiple stations in the machine group.

Based on the above, the production schedule estimation method and the production schedule estimation system of the semiconductor process according to the disclosure may effectively predict the daily move data of the multiple stations in the machine group that the semiconductor process product passes through during the process through the prediction model.

To make the above features and advantages more comprehensible, several embodiments accompanied by drawings are described in detail as follows.

DESCRIPTION OF THE EMBODIMENTS

Figure 1:
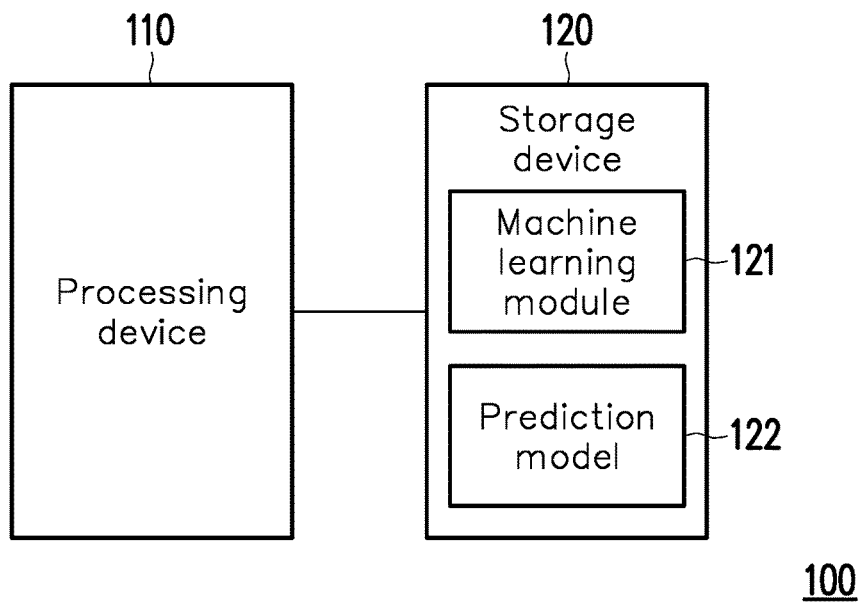
FIG. 1 is a schematic diagram of a production schedule estimation system of a semiconductor process according to an embodiment of the disclosure.

In order to enhance comprehension of the content of the disclosure, the following embodiments are specifically cited as examples in which the disclosure may be implemented. In addition, wherever possible, elements/components/steps with the same reference numerals in the drawings and the embodiments represent the same or similar components.

FIG. 1 is a schematic diagram of a production schedule estimation system of a semiconductor process according to an embodiment of the disclosure. With reference to FIG. 1, a production schedule estimation system 100 includes a processing device 110 and a storage device 120. The processing device 110 is coupled to the storage device 120. The storage device 120 may store a machine learning (ML) module 121 and a prediction model 122. The prediction model 122 is an artificial intelligence (AI) model. In the embodiment, the processing device 110 may execute the machine learning module 121, so as to obtain cycle time (CT) (or also known as retention time) data of a machine group and productivity data of the machine group of the semiconductor process. The cycle time data of the machine group is a sum of waiting time prior to reaching a machine and processing time of the machine. The processing device 110 may respectively input current-day work-in-process data (half-finished product information and/or newly-inputted product information of the semiconductor process), the cycle time data of the machine group, and the productivity data of the machine group into the executed prediction model 122, to enable the prediction model 122 to output current-day cycle time data and a current-day move volume for each of multiple stations (multiple machines of the semiconductor process) in the machine group.

It should be noted that the "machine group" in the embodiment may refer to, for example, a combination of multiple machines of a semiconductor process that handle the same semiconductor process task such as a furnace control process machine group, a photolithography process machine group, or an etching process machine group, which is not limited by the disclosure. In addition, the "work-in-process" mentioned in the embodiment may refer to, for example, half-finished units or wafers of a semiconductor product such as a memory chip and a processing chip in the semiconductor process, and the disclosure does not limit a type of the semiconductor product.

In the embodiment, the processing device 110 may, for example, include a central processing unit (CPU) with an arithmetic function, or other programmable general-purpose or special-purpose microprocessors, a digital signal processor (DSP), a programmable controller, an application-specific integrated circuit (ASIC), a programmable logic device (PLD), other similar processing devices, or a combination of these devices. The storage device 120 may be, for example, a dynamic random access memory (DRAM), a flash memory, or a non-volatile random access memory (NVRAM). The storage device 120 may store the machine learning module 121, the prediction model 122, and related data described in each embodiment for accessing and execution by the processing device 110.

Figure 2:
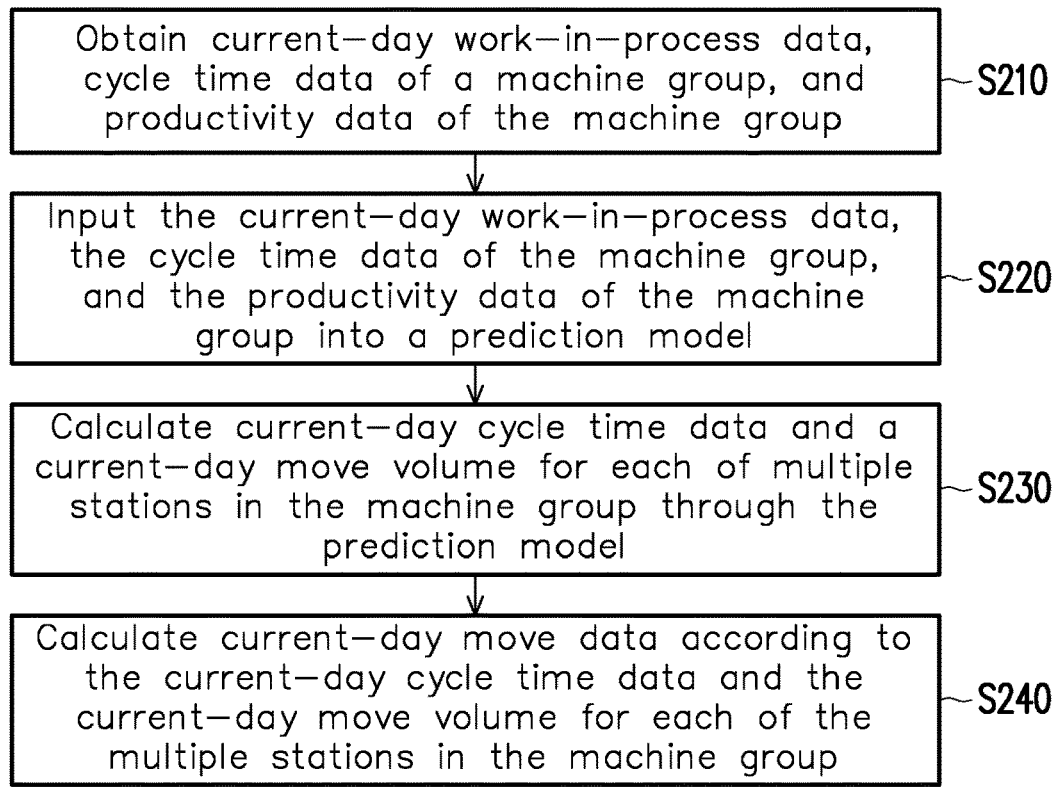
FIG. 2 is a flowchart of a production schedule estimation method of the semiconductor process according to an embodiment of the disclosure.

FIG. 2 is a flowchart of a production schedule estimation method of the semiconductor process according to an embodiment of the disclosure. With reference to FIGS. 1 and 2, the production schedule estimation system 100 may execute Steps S210 to S240 as follows, so as to realize production schedule estimation. In the Step S210, the processing device 110 may obtain the current-day work-in-process data, the cycle time data of the machine group, and the productivity data of the machine group. In the embodiment, the processing device 110 may obtain the current-day work-in-process data inputted by a semiconductor manufacturer, or, obtain type of (unfinished) work-in-process and a quantity of the work-in-process moved on a previous day from previous-day move data as predicted by the prediction model 122 to serve as the current-day work-in-process data. In the embodiment, the processing device 110 may obtain the cycle time data of the machine group and the productivity data of the machine group provided by the machine learning module 121.

In the Step S220, the processing device 110 may input the current-day work-in-process data, the cycle time data of the machine group, and the productivity data of the machine group into the prediction model 122. In the Step S230, the processing device 110 may calculate the current-day cycle time data and the current-day move volume for each of the multiple stations in the machine group through the prediction model 122. In the Step S240, the processing device 110 may calculate current-day move data according to the current-day cycle time data and the current-day move volume for each of the multiple stations in the machine group. In the embodiment, the processing device 110 may further calculate and obtain the current-day move data according to the current-day cycle time data and the current-day move volume for each of the multiple stations in the machine group. It should be noted that the current-day move data refers to quantities of resultant products and work-in-process (WIP) that pass through the multiple stations in one or more machine groups, and the type of work-in-process. Therefore, the production schedule estimation system 100 and the production schedule estimation method of the embodiment may obtain a dynamic machine stagnation time of a current-day learning result, so as to allow the semiconductor manufacturer to use this information to perform accurate semiconductor production schedule planning.

Figure 3:
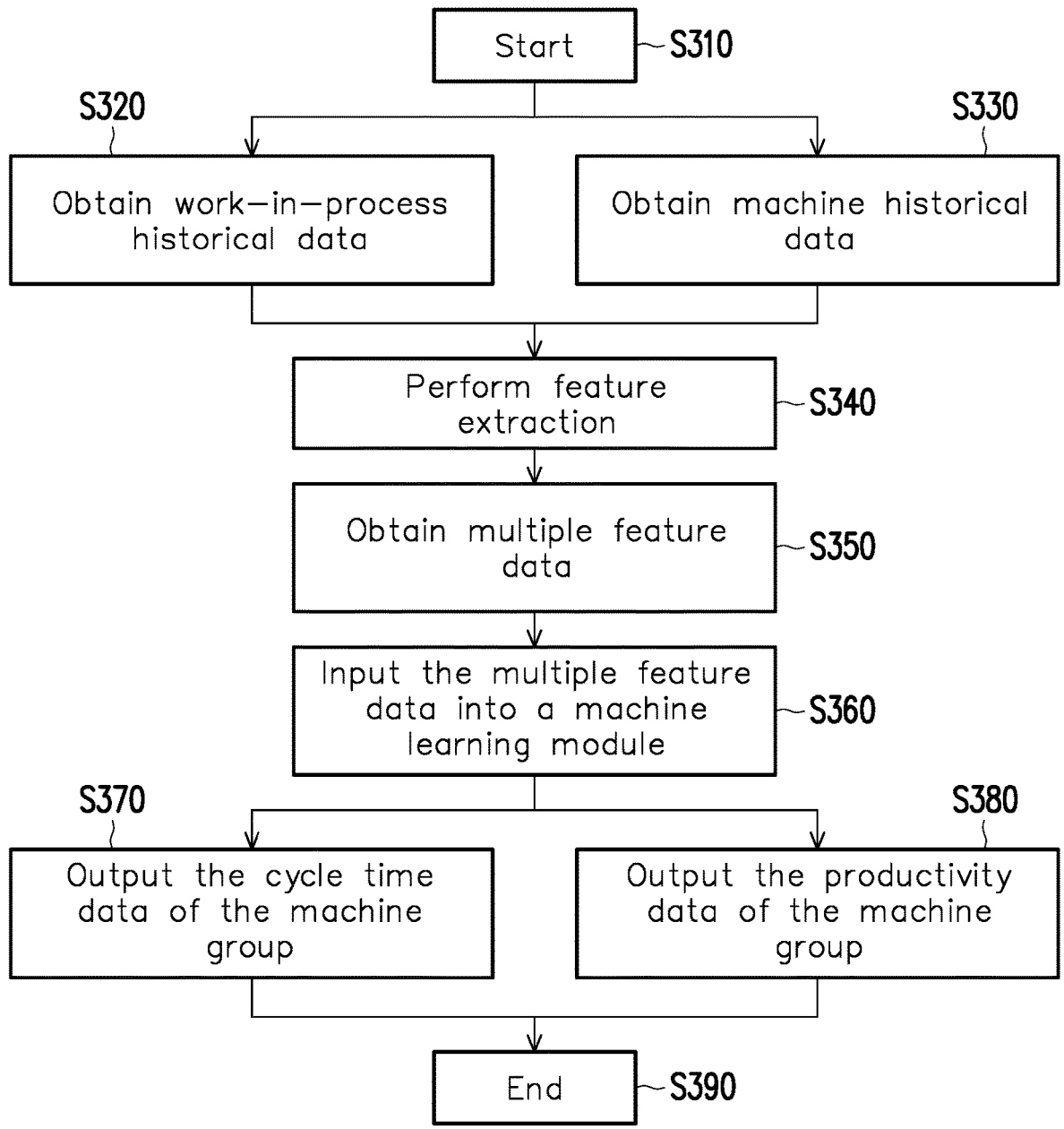
FIG. 3 is a flowchart of obtaining the cycle time data of the machine group and the productivity data of the machine group according to an embodiment of the disclosure.

FIG. 3 is a flowchart of obtaining the cycle time data of the machine group and the productivity data of the machine group according to an embodiment of the disclosure. With reference to FIGS. 1 and 3, the production schedule estimation system 100 may execute Steps S310 to S390 as follows, so as to obtain the cycle time data of the machine group and the productivity data of the machine group. In the Step S310, the processing device 110 reads the machine learning module 121 stored in the storage device 120, and executes the machine learning module 121. In the Step S320, the processing device 110 may obtain work-in-process historical data. In the Step S330, the processing device 110 obtains machine historical data. In the Step S340, the processing device 110 may perform feature extraction on the work-in-process historical data and the machine historical data. In the Step S350, the processing device 110 may obtain multiple feature data.

In the embodiment, the manufacturer may input the WIP historical data and the machine historical data into the production schedule estimation system 100. The processing device 110 may extract related data such as stagnation time data of different quantities of the work-in-process and different types of the work-in-process respectively of different stations from product historical data to serve as feature data. The processing device 110 may extract related data such as daily move data (that is, daily production capacity), up-time data, down-time data, mean time between failures (MTBF) data, and mean time to recovery (MTTR) data of the different stations from the machine historical data to serve as feature data.

In the Step S360, the processing device 110 may input the foregoing multiple feature data into the machine learning module 121. In the Step S370, the machine learning module 121 may output the cycle time data of the machine group. In the embodiment, the cycle time data of the machine group may include multiple cycle times of the machine group corresponding to the multiple stations of the same machine type in each machine group for the different quantities of the work-in-process and the different types of the work-in-process (different quantities and different types of unfinished semiconductor products). In the Step S380, the machine learning module 121 may output the productivity data of the machine group. In the embodiment, the productivity data of the machine group may include at least one of multiple move volume data, multiple up-time data, multiple mean time between failures data, and multiple mean time to recovery data corresponding to the multiple stations of the same machine type in each machine group for the different quantities of the work-in-process and the different types of the work-in-process (different product combinations) inputted. In the Step S390, the processing device 110 may end the calculation of the machine learning module 121, and continue to execute the production schedule estimation of the semiconductor process in FIG. 4 as follows. Therefore, the processing device 110 of the embodiment may effectively obtain the cycle time data of the machine group and the productivity data of the machine group, so as to enable the prediction model 122 to predict a production result of the semiconductor process.

Figure 4:
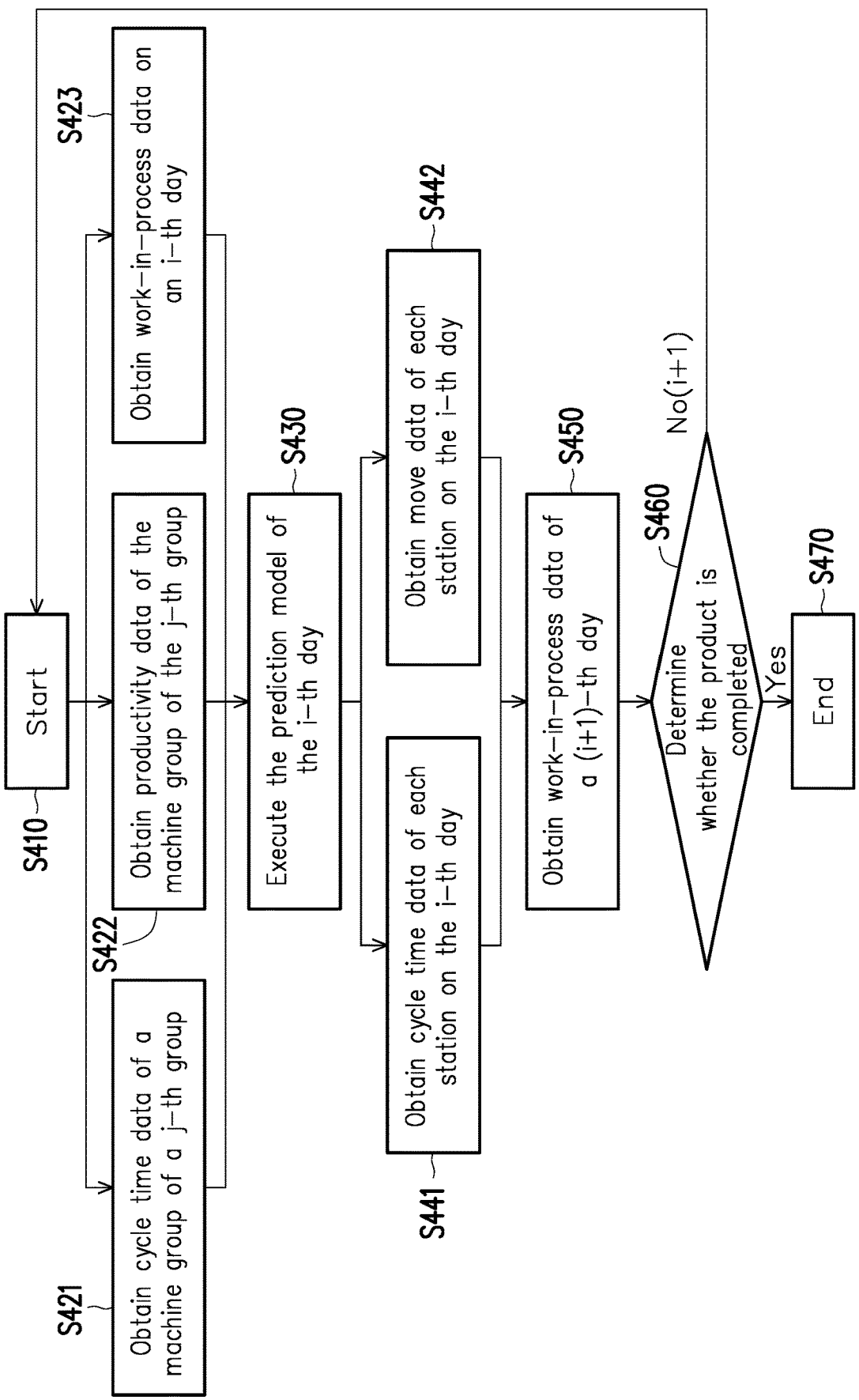
FIG. 4 is a flowchart of a production schedule estimation method of the semiconductor process according to another embodiment of the disclosure.

FIG. 4 is a flowchart of a production schedule estimation method of the semiconductor process according to another embodiment of the disclosure. With reference to FIGS. 1 and 4, the production schedule estimation system 100 may perform Steps S410 to S470 as follows, so as to obtain the cycle time data of the machine group and the productivity data of the machine group. In the Step S410, the processing device 110 may read the prediction model 122 stored in the storage device 120, and execute the prediction model 122. In the Step S421, the prediction model 122 may obtain cycle time data of a machine group of a j-th group, where j is a positive integer. In the embodiment, the processing device 110 may obtain the cycle time data of the machine group of the j-th group that may be operated on a current day from the cycle time data of the machine group obtained in the above-mentioned embodiment, and input it into the prediction model 122. In the Step S422, the prediction model 122 may obtain productivity data of the machine group of the j-th group. In the embodiment, the processing device 110 may obtain the productivity data of the machine group of the j-th group that may be operated on the current day from the productivity data of the machine group obtained in the above-mentioned embodiment, and input it into the prediction model 122. In the Step S423, the prediction model 122 may obtain work-in-process data on an i-th day, where i is a positive integer. In the embodiment, the work-in-process data on the i-th day may be current-day work-in-process data inputted by the manufacturer, or a type of (unfinished) work-in-process and a quantity of the work-in-process moved on (i−1)-th day obtained from the (i−1)-th day move data predicted by the prediction model 122 to serve as the work-in-process data on the i-th day.

In the Step S430, the processing device 110 may execute the prediction model 122 of the i-th day. The prediction model 122 may perform a prediction calculation based on the foregoing multiple data. In the Step S441, the processing device 110 may obtain cycle time data of each station on the i-th day. In the Step S442, the processing device 110 may obtain move data of each station on the i-th day. In the embodiment, the cycle time data (CT(i,j)) of each station on the i-th day and the move data (Move(i,j)) of each station on the i-th day may be respectively determined by the prediction model 122 is generated based on related data such as a quantity of the work-in-process (WIP(i,j)) (that is, the quantity of the work-in-process completed on the (i−1)-th day) that is going to flow into the machine group of the j-th group at beginning of the i-th day, and a quantity of the work-in-process (Close_WIP(i,j)) (that is, work-in-process that is completed in a machine group in front of the j-th group on the i-th day) that may flow into the j-th group on the i-th day, a scheduled maintenance time (PM) (that is, maintenance time) of the machine group of the j-th group on the i-th day, and whether the i-th day is a holiday (Holiday(i)) (that is, down day).

In this regard, calculations of the cycle time quantity (CT(i,j)) of each station on the i-th day and the output quantity (Move(i,j)) of each station on the i-th day may be expressed in programming language as the following Formula (1) and Formula (2).

$$CT(i,j)=AI\_CT\_F(WIP(i,j), Close_{WIP(i,j)}, PM(i,j), Holiday(i)\ldots) \quad \text{Formula (1)}$$

$$Move(i,j)=AI\_Move\_F(WIP(i,j), Close_{WIP(i,j)}, PM(i,j), Holiday(i)\ldots) \quad \text{Formula (2)}$$

In this regard, the cycle time (CT(i,j,p,s)) of different types of the work-in-process on the i-th day of different stations in the j-th group is equal to the cycle time (CT(i,j)) of each station on the i-th day, which as a result, may be expressed in the programming language as the following Formula (3). A parameter p and a parameter s are positive integers, and the parameter p represents a certain type of the work-in-process, and the parameter s represents a certain station.

$$CT(i,j,p,s)=CT(i,j) \quad \text{Formula (3)}$$

In this regard, an accumulation of the cycle time of each station from first day to the i-th day may be expressed in the programming language as the following Formula (4).

$$Acc\_CT(i,j,p,s)=\Sigma(S=1\ to\ s)CT(i,j,p,s) \quad \text{Formula (4)}$$

In this regard, calculation of the move quantity (Move(i,j,p,s)) of a certain station of a certain type of the work-in-process on the i-th day may be expressed in the programming language as the following Formula (5), where AI_GA_Move_ratio_F(i,j,p,s) is a move ratio representing a certain type of the work-in-process.

$$Move(i,j,p,s)=AI\_GA\_Move\_ratio\_F(i,j,p,s)*Move(i,j) \quad \text{Formula (5)}$$

In the Step S450, the processing device 110 may calculate work-in-process data of a (i+1)-th day. In the embodiment, quantity of work-in-process (WIP(i+1,j)) on the (i+1)-th day may be a result of accumulating the quantity of the work-in-process (WIP(i+1,j,p,s)) of each type of the work-in-process at each station on the (i+1)-th day, and may be expressed in the programming language as the following Formula (6).

$$WIP(i+1,j)=\Sigma p\Sigma s WIP(i+1,j,p,s) \quad \text{Formula (6)}$$

In addition, the quantity of the work-in-process (WIP(i+1,j,p,s)) of a certain type of the work-in-process at a certain station on the (i+1)-th day may be the quantity of the work-in-process (WIP(i,j,p,s)) of the certain type of the work-in-process at the certain station on the i-th day minus the move quantity (Move(i,j,p,s)) of the certain type of the work-in-process at the certain station on the i-th day, plus a cumulative result (ΣJMove(i,j,p,s−1)) of completed quantity of the certain type of the work-in-process at a previous station on the i-th day, where the result may be expressed in the programming language as the following Formula (7).

$$WIP(i+1,j,p,s)=WIP(i,j,p,s)-Move(i,j,p,s)+\Sigma J\,Move(i,J,p,s-1) \quad \text{Formula (7)}$$

It should be noted that in the process of calculating the work-in-process data on the i-th day, the processing device 110 may obtain the move data on the i-th day (the current-day move data), and the move data on the i-th day includes the type of the work-in-process after the work-in-process has been processed by the multiple stations in the machine group of the j-th group and move volume on the i-th day. In this regard, calculation of the move volume on the i-th day, that is, quantity of the work-in-process (Close_WIP(i+1,j)) that may flow into the machine group of the j-th group on the (i+1)-th day may be performed in the programming language as the following Formula (8).

$$Close\_WIP(i+1,j)=\Sigma p\Sigma s\Sigma J\,WIP(i+1,J,p,s) \quad \text{Formula (8)}$$

In the Step S460, the processing device 110 may determine whether the product is completed. When the product is incomplete, the Step S410 is executed again to perform prediction of the next day (i+1). When the product is completed, the Step S470 is executed to end the prediction. It should be noted that the processing device 110 may extract next-day work-in-process data from the current-day move data. In this regard, in the process of recursively executing the Steps S410 to S460, the processing device 110 may calculate the next-day work-in-process data according to daily cycle time data of each of the multiple stations in the machine group and daily move volume, and recursively execute the prediction model 122, so as to obtain production time of the product and move quantity of the product. The move quantity of the product is a sum of multiple move volumes corresponding to every of the multiple stations in multiple machine groups on different days generated in the process of recursively executing the production schedule estimation method (the Steps S410-S460). In addition, the multiple cycle time data corresponding to the different days generated during the recursive execution of the production schedule estimation method (the Steps S410 to S460) are multiple dynamic machine cycle times. Therefore, based on recursive execution results of the above-mentioned Steps S410 to S470, the prediction model 122 may accurately predict time required for completion of the process flow of the semiconductor process product, and may predict related data such as the type of the work-in-process completed at each station of each machine group daily and the quantity of the work-in-process, so as to realized accurate production schedule estimation.

In summary, the production schedule estimation method and system of the semiconductor process according to the disclosure may realize accurate production schedule estimation results through two-stage estimation calculation. The production schedule estimation method and system of the semiconductor process according to the disclosure may first generate the dynamic cycle time data of the machine group and the productivity data of the machine group that may change with different dates through machine learning according to the work-in-process historical data and the semiconductor process machine historical data. Then, the production schedule estimation method and system of the semiconductor process according to the disclosure may further accurately predict the time required for the completion of process flow of the semiconductor process product through the prediction model according to the dynamic cycle time data of the machine group and the productivity data of the machine group that may change with the different dates. In addition, the production schedule estimation method and system of the semiconductor process according to the disclosure may also predict related estimation information such as the type of the work-in-process and the quantity of the work-in-process completed daily at each station of each machine group, so as to allow the semiconductor manufacturer to use the foregoing related estimation information to design an effective semiconductor process production schedule, thereby effectively improving the efficiency of the semiconductor process.

Although the disclosure has been described with reference to the abovementioned embodiments, they are not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A production schedule estimation method of a semiconductor process, comprising:
recursively executing:
obtaining a current-day work-in-process data, a cycle time data of a machine group, and a productivity data of the machine group;
inputting the current-day work-in-process data, the cycle time data of the machine group, and the productivity data of the machine group into a prediction model;
calculating a current-day cycle time data and a current-day move volume for each of a plurality of stations in the machine group through the prediction model;
calculating a current-day move data according to the current-day cycle time data and the current-day move volume for the each of the plurality of stations in the machine group, wherein the current-day move data comprises a type of a work-in-process and a current-day move volume after the work-in-process has been processed by the plurality of stations in the machine group on the current day;
calculating a next-day work-in-process data according to the current-day cycle time data and the current-day move volume for the each of the plurality of stations in the machine group, and executing the prediction model, so as to obtain a product production time and a quantity of a product produced;
summing a plurality of move volumes corresponding to each of the plurality of stations in a plurality of machine groups on different days generated according to above recursive execution to generate the quantity of the product produced and the product production time;
estimating a production schedule according to the product production time and the quantity of the product produced; and
controlling the machine group based on the estimated production schedule,
wherein the step of obtaining the cycle time data of the machine group and the productivity data of the machine group comprises:
obtaining a work-in-process historical data and a machine historical data;
performing a feature extraction on the work-in-process historical data and the machine historical data, so as to obtain a plurality of feature data; and
inputting the plurality of feature data into a machine learning module, to enable the machine learning module to perform a prediction to output the cycle time data of the machine group and the productivity data of the machine group.

2. The production schedule estimation method according to claim 1, wherein a plurality of cycle time data corresponding to different days generated during recursive execution of the production schedule estimation method are a plurality of dynamic cycle times of a machine.

3. The production schedule estimation method according to claim 1, wherein the cycle time data of the machine group comprises a plurality of cycle times of the machine group corresponding to a plurality of stations of a same machine type for different quantities of work-in-process and different types of the work-in-process.

4. The production schedule estimation method according to claim 1, wherein the productivity data of the machine group comprises at least one of a plurality of move volume data, a plurality of up-time data, a plurality of mean time between failures data, and a plurality of mean time to recovery data corresponding to a plurality of stations of a same machine type for different quantities of work-in-process and different types of the work-in-process inputted.

5. The production schedule estimation method according to claim 1, wherein the plurality of feature data comprises a daily move data, an up-time data, a down-time data, a mean time between failures data, and a mean time to recovery data of different stations.

6. The production schedule estimation method according to claim 1, wherein the plurality of feature data comprises stagnation time data of different quantities of a work-in-process and different types of the work-in-process respectively of different stations.

7. A production schedule estimation system of a semiconductor process, comprising:
a storage device, configured to store a prediction model; and
a processing device, coupled to the storage device and configured to recursively execute;
obtaining a current-day work-in-process data, a cycle time data of a machine group, and a productivity data of the machine group, inputting the current-day work-in-process data, the cycle time data of the machine group, and the productivity data of the machine group into the prediction model, and calculating a current-day cycle time data and a current-day move volume for each of a plurality of stations in the machine group through the prediction model,
wherein the current-day move data comprises a type of a work-in-process and a current-day move volume after the work-in-process has been processed by the plurality of stations in the machine group on the current day;
calculating a current-day move data according to the current-day cycle time data and the current-day move volume for the each of the plurality of stations in the machine group;
calculating a next-day work-in-process data according to the current-day cycle time data and the current-day move volume for the each of the plurality of stations in the machine group, and executing the prediction model, so as to obtain a product production time and a quantity of a product produced;
summing a plurality of move volumes corresponding to each of the plurality of stations in a plurality of machine groups on different days generated according to above recursive execution to generate the quantity of the product produced and the product production time;
estimating a production schedule according to the product production time and the quantity of the product produced and controlling the machine group based on the estimated production schedule;
obtaining a work-in-process historical data and a machine historical data;
performing a feature extraction on the work-in-process historical data and the machine historical data, so as to obtain a plurality of feature data; and
inputting the plurality of feature data into a machine learning module, to enable the machine learning module to perform a prediction to output the cycle time data of the machine group and the productivity data of the machine group.

8. The production schedule estimation system according to claim 7, wherein a plurality of cycle time data corresponding to different days generated during recursive execution of the production schedule estimation method are a plurality of dynamic cycle times of a machine.

9. The production schedule estimation system according to claim 7, wherein the cycle time data of the machine group comprises a plurality of cycle times of the machine group corresponding to a plurality of stations of a same machine type for different quantities of work-in-process and different types of the work-in-process.

10. The production schedule estimation system according to claim 7, wherein the productivity data of the machine group comprises at least one of a plurality of move volume data, a plurality of up-time data, a plurality of mean time between failures data, and a plurality of mean time to recovery data corresponding to a plurality of stations of a same machine type for different quantities of work-in-process and different types of the work-in-process inputted.

11. The production schedule estimation system according to claim 7, wherein the plurality of feature data comprises a daily move data, an up-time data, a down-time data, a mean time between failures data, and a mean time to recovery data of different stations.

12. The production schedule estimation system according to claim 7, wherein the plurality of feature data comprises stagnation time data of different quantities of a work-in-process and different types of the work-in-process respectively of different stations.

* * * * *